US012809992B2

(12) United States Patent
McParland et al.

(10) Patent No.: US 12,809,992 B2
(45) Date of Patent: Nov. 24, 2026

(54) GENERALIZED CYBER EXPOSURE SCORING FRAMEWORK

(71) Applicant: Tenable, Inc., Columbia, MD (US)

(72) Inventors: Damien McParland, Dublin (IE); Bryan Peter Doyle, Dublin (IE)

(73) Assignee: Tenable, Inc., Columbia, MD (US)

( * ) Notice: Subject to any disclaimer, the term of this patent is extended or adjusted under 35 U.S.C. 154(b) by 69 days.

(21) Appl. No.: 18/968,968

(22) Filed: Dec. 4, 2024

(65) Prior Publication Data

US 2026/0154416 A1 Jun. 4, 2026

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

2016/0072835 A1* 3/2016 Roytman ............ H04L 63/1408 726/25
2020/0210590 A1* 7/2020 Doyle ................... G06F 21/577
2021/0126936 A1* 4/2021 Gerber, Jr. .............. H04L 63/20
2021/0400074 A1* 12/2021 Smith ................. H04L 63/1408
2022/0286474 A1* 9/2022 Kuppa .................. H04L 63/145
2023/0336579 A1* 10/2023 Ellsworth ........... H04L 63/1433
2023/0421581 A1* 12/2023 dos Santos ......... H04L 63/1408
2025/0371161 A1* 12/2025 Beek ...................... G06F 21/577
2025/0373647 A1* 12/2025 Bazak ................... G06F 21/577
2025/0384144 A1* 12/2025 Pettel .................... G06F 21/577
2025/0392613 A1* 12/2025 Bolturk ................. G06F 21/577
2026/0012476 A1* 1/2026 Anand ................ H04L 63/1433
2026/0019443 A1* 1/2026 Kunal ................... G06F 21/577
2026/0052166 A1* 2/2026 Palumbo ............. H04L 63/1433
2026/0067326 A1* 3/2026 Freitas .................. G06F 21/552
2026/0080055 A1* 3/2026 Fulton ................... G06F 21/552
2026/0081939 A1* 3/2026 Boyer ...................... H04L 41/16
2026/0087145 A1* 3/2026 Sekar ..................... G06F 21/577
2026/0089182 A1* 3/2026 Heling ................ H04L 63/1433

* cited by examiner

*Primary Examiner* — Stephen T Gundry
(74) *Attorney, Agent, or Firm* — MUNCY, GEISSLER, OLDS & LOWE, P.C.; Daniel Podhajny

(57) ABSTRACT

In some aspects, a component may obtain an asset criticality score of an asset. The component may obtain a plurality of vulnerability severity parameters associated with the asset from a plurality of sources. The component may determine a global asset exposure score of the asset based on the asset criticality score and the plurality of vulnerability severity parameters, wherein the global asset exposure score represents a vulnerability exposure of the asset detected by the plurality of sources.

44 Claims, 10 Drawing Sheets

GENERALIZED CYBER EXPOSURE SCORING FRAMEWORK

BACKGROUND OF THE DISCLOSURE

1. Field of the Disclosure

Aspects relate to systems and methods for determining vulnerability scores of digital assets for cyber vulnerability assessments.

2. Description of the Related Art

Many different types of findings may be detected on a single asset. For example, software vulnerabilities, cloud misconfigurations, web application vulnerabilities, identity misconfigurations, etc., may be detected by various vulnerability detection tools. Under current vulnerability scoring algorithms, an asset may have only a single exposure score relating to a particular finding type. There is a need for assessing cyber vulnerabilities by utilizing vulnerability detection tools from various sources.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method includes obtaining an asset criticality score of an asset; obtaining a plurality of vulnerability severity parameters associated with the asset from a plurality of sources; and determining a global asset exposure score of the asset based on the asset criticality score and the plurality of vulnerability severity parameters, wherein the global asset exposure score represents a vulnerability exposure of the asset detected by the plurality of sources.

In an aspect, a component includes one or more memories; and one or more processors communicatively coupled to the one or more memories, the one or more processors, either alone or in combination, configured to: obtain an asset criticality score of an asset; obtain a plurality of vulnerability severity parameters associated with the asset from a plurality of sources; and determine a global asset exposure score of the asset based on the asset criticality score and the plurality of vulnerability severity parameters, wherein the global asset exposure score represents a vulnerability exposure of the asset detected by the plurality of sources.

In an aspect, a component includes means for obtaining an asset criticality score of an asset; means for obtaining a plurality of vulnerability severity parameters associated with the asset from a plurality of sources; and means for determining a global asset exposure score of the asset based on the asset criticality score and the plurality of vulnerability severity parameters, wherein the global asset exposure score represents a vulnerability exposure of the asset detected by the plurality of sources.

In an aspect, a non-transitory computer-readable medium stores computer-executable instructions that, when executed by a component, cause the component to: obtain an asset criticality score of an asset; obtain a plurality of vulnerability severity parameters associated with the asset from a plurality of sources; and determine a global asset exposure score of the asset based on the asset criticality score and the plurality of vulnerability severity parameters, wherein the global asset exposure score represents a vulnerability exposure of the asset detected by the plurality of sources.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

Figure 1:
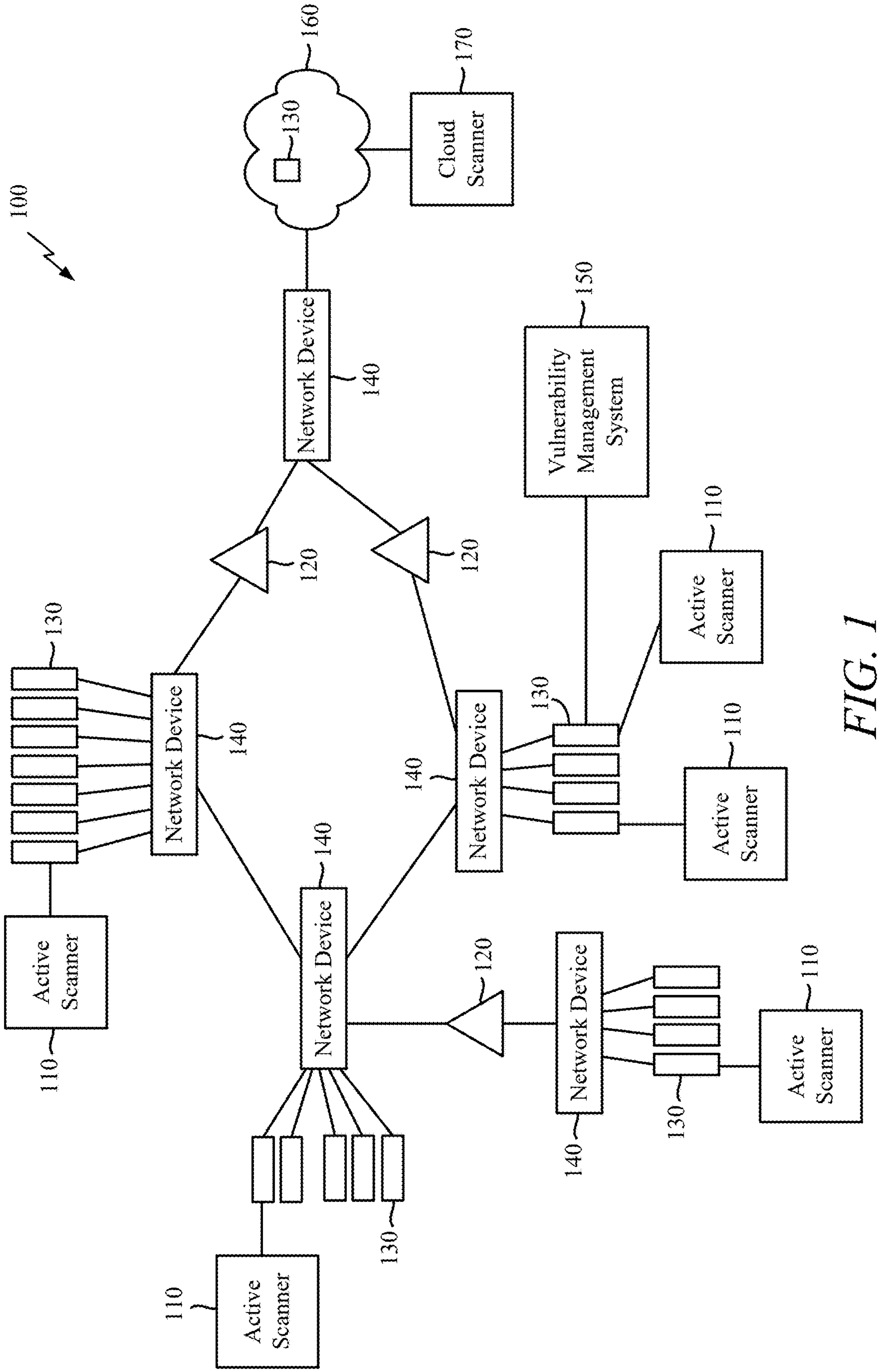
FIG. 1 illustrates an exemplary network having various assets that can be managed using a vulnerability management system, according to various aspects.

The accompanying drawings are presented to aid in the description of various aspects of the disclosure and are provided solely for illustration of the aspects and not limitation thereof.

DETAILED DESCRIPTION

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes. Further, assets may encompass tangential network aspects such as policies, rules and so forth.

Assets may also be implemented within or as part of cloud network architecture (e.g., cloud assets may correspond to instances or virtual machines (VMs), particular devices or groups of devices, distributed resources across multiple devices and/or locations, etc.) By way of examples, cloud assets may include, but are not limited to, any of the following examples which are characterized with respect to AMAZON, GOOGLE and MICROSOFT cloud services (e.g., Amazin Web Services. Microsoft Azure, Google Cloud). e.g.:

'aws_athena_database'
'aws_db_instance'
'aws_db_snapshot'
'aws_dynamodb_table'
'aws_ecr_repository'
'aws_ecr_repository_policy'
'aws_ecs_cluster'
'aws_ecs_service'
'aws_eks_cluster'
'aws_elb'
'aws_emr_cluster'
'aws_instance'
'aws_nat_gateway'
'aws_rds_cluster'
'aws_rds_cluster_instance'
'aws_redshift_cluster'
'aws_s3_bucket'
'aws_s3_bucket_policy'
'azurerm_container_group'
'azurerm_container_registry'
'azurerm_kubernetes_cluster'
'azurerm_lb'
'azurerm_linux_virtual_machine'
'azurerm_mariadb_server'
'azurerm_mssql_server'
'azurerm_mssql_virtual_machine'
'azurerm_mysql_database'
'azurerm_mysql_server'
'azurerm_postgresql_database'
'azurerm_postgresql_server'
'azurerm_sql_database'
'azurerm_sql_server'
'azurerm_storage_container'

-continued

| |
|---|
| 'azurerm_virtual_machine_scale_set' |
| 'azurerm_windows_virtual_machine' |
| 'google_bigquery_dataset' |
| 'google_bigquery_table' |
| 'google_compute_forwarding_rule' |
| 'google_compute_global_forwarding_rule' |
| 'google_compute_instance' |
| 'google_container_cluster' |
| 'google_container_registry' |
| 'google_sql_database' |
| 'google_sql_database_instance' |
| 'google_storage_bucket' |
| 'kubernetes_cluster' |
| 'kubernetes_pod' |

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived asses like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. As used herein "credentialed" scans rely upon user credential(s) for authentication. Credentialed scans can perform a wider variety of checks than non-credentialed scans, which can result in more accurate scan results. Non-credentialed scans by contrast do not rely upon user credential(s) for authentication. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
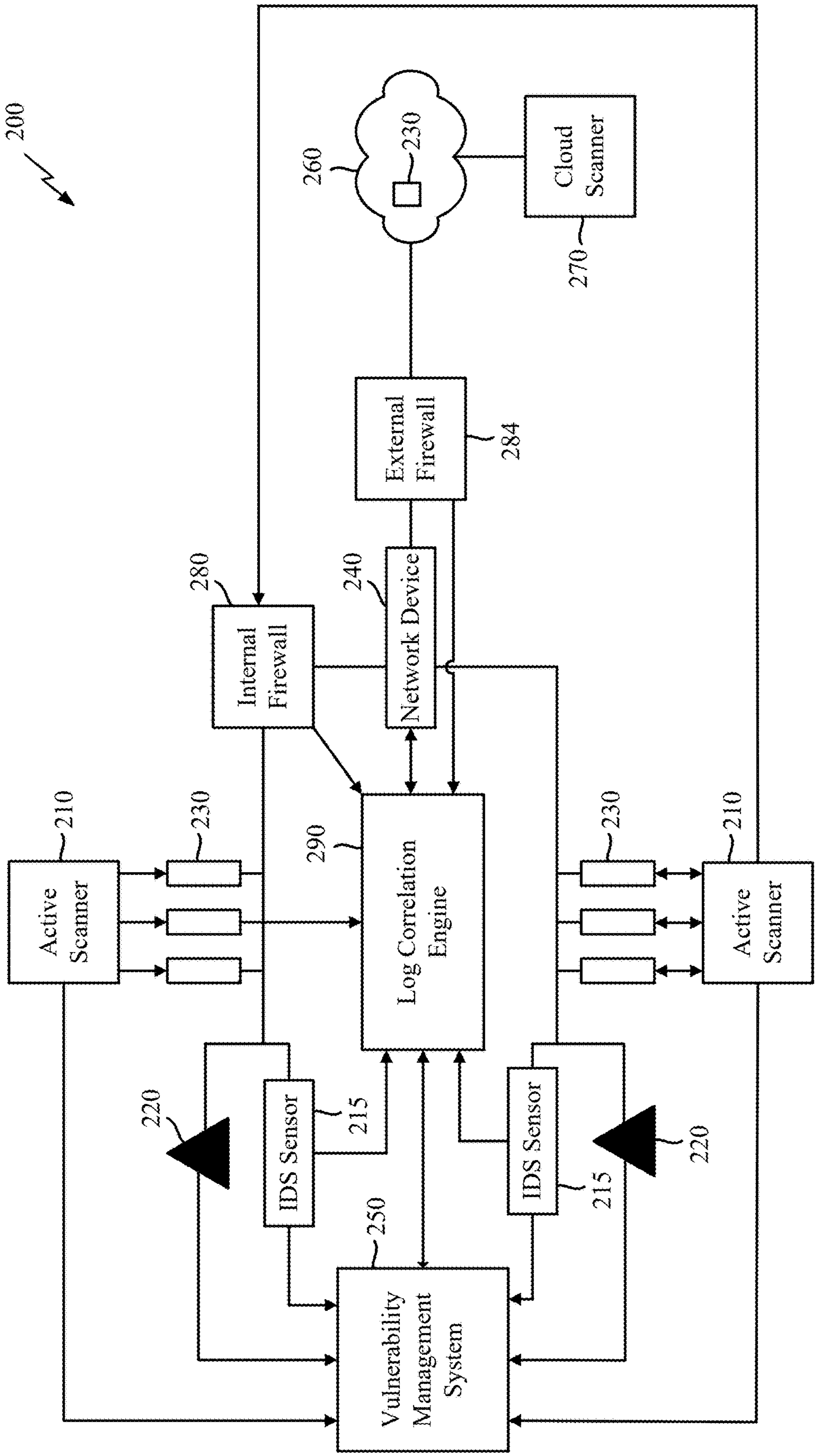
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Security auditing applications typically display security issues (such as vulnerabilities, security misconfigurations, weaknesses, etc.) paired with a particular solution for that given issue. Certain security issues may share a given solution, or have solutions which are superseded or otherwise rendered unnecessary by other reported solutions. Embodiments of the disclosure relate to improving an efficiency by which security issues are reported, managed and/or rectified based on solution supersedence.

In accordance with a first embodiment, when working with security reporting datasets with sparse metadata available, the reported solutions for each security issue are combined, and various "rulesets" are applied against the combined solutions to de-duplicate them and remove solutions that have been superseded by other solutions. As used herein, a ruleset is a set of rules that govern when a solution is to be removed or merged with another and how that merge is to be accomplished. In an example, when solution texts not matching a given ruleset are discovered they are flagged for manual review. Examples of rules that may be included in one or more rulesets are as follows:

- If there is more than one matching solution in the solution list, remove all but one of those solutions.
- For solutions matching "Upgrade to <product> x.y.z" where x, y, and z are integers, select a single result with the highest x.y.z value (comparing against x first, then y, then z).
- For solutions matching "Apply fix <fix> to <product>", create a new combined solution where <fix> for each solution is concatenated into a comma separated list for a given <product>.

In accordance with a second embodiment, when working with datasets with metadata available that have an identifier that allows grouping of solutions based on product (e.g., common product enumeration (CPE)) and timestamp information on when a fix has become available, the solutions for each group can be filtered with only display the latest "top level" solution for each group being displayed. In an example, the first and second embodiments can be implemented in conjunction with each other to produce a further refined solution set.

As used herein, a "plug-in" contains logic and metadata for an individual security check in a security auditing application. A plugin may check for one or more mitigations/fixes and flag one or more individual security issues. CPE is a standardized protocol of describing and identifying classes of applications, operating systems, and hardware devices present among an enterprise's computing assets. CPE identifiers contain asset type information (OS/Hardware/Application), vendor, product, and can even contain version information. An example CPE string is "cpe:/o:microsoft:windows_vista:6.0:sp1", where "/o" stands for operating system, Microsoft is the vendor, windows_vista is the product, major version is 6.0, and minor version is SP1. Further, a common vulnerabilities and exposures (CVE) identifier is an identifier from a national database maintained by NIST/Mitre which keeps a list of known vulnerabilities and exposures. An example identifier would be "CVE-2014-6271" which corresponds to the "ShellShock" vulnerability in the database.

In accordance with one implementation of the second embodiment, solutions (or solution 'texts') may first together based on the CPEs in the plugins they were reported in. The solutions are then sorted by the patch publication date from the plugins which they were sourced from. Solutions containing text that matches a pattern that indicates that the solution is likely a patch recommendation can all be removed from the group except the solution associated with the most recent patch. In this manner, patches with identifiers that cannot be easily sorted (e.g., patches with non-numerical identifiers) and/or for which no ruleset pertains in accordance with the first embodiment can be filtered out from the solution set. In some implementations, additional ruleset-based filtering from the first embodiment can also be applied, to filter out (or de-duplicate) additional duplicate solution information.

In accordance with a third embodiment, a security auditing application may evaluate further metadata in the solution report results that is added based upon asset-specific information (e.g., such as individual patches installed, which mitigations and patches are missing, what individual software installations are installed, patch supersedence information, the relationship between the mitigations/patches and security issues, etc.).

Web applications can be an essential way to conduct business. Unfortunately, web applications can also be vulnerable to attacks (e.g., denial of service, disclosure of private information, network infiltration, etc.) due to their exposure to public internet. Thus, addressing vulnerabilities before an attacker can exploit them is a high priority. Web application scanning (WAS) can be performed to identify vulnerabilities associated with web applications. For example, a web application scanner (or simply "scanner") may be used to scan externally accessible website page for vulnerable web applications.

WAS scans may take a relatively long time to perform, and many scans of redundant web pages or substantially redundant web pages may be performed. For example, a newly scanned web page may include only altered content (e.g., text, images, video, etc.) without any functional alterations, making that scan redundant.

When crawling a web application, a large number of web pages are discovered. Hence, deciding which of these web pages to audit via a security audit scan, and which will provide little to no benefit in auditing via the security audit scan, may help to reduce WAS scan times.

Figure 3:
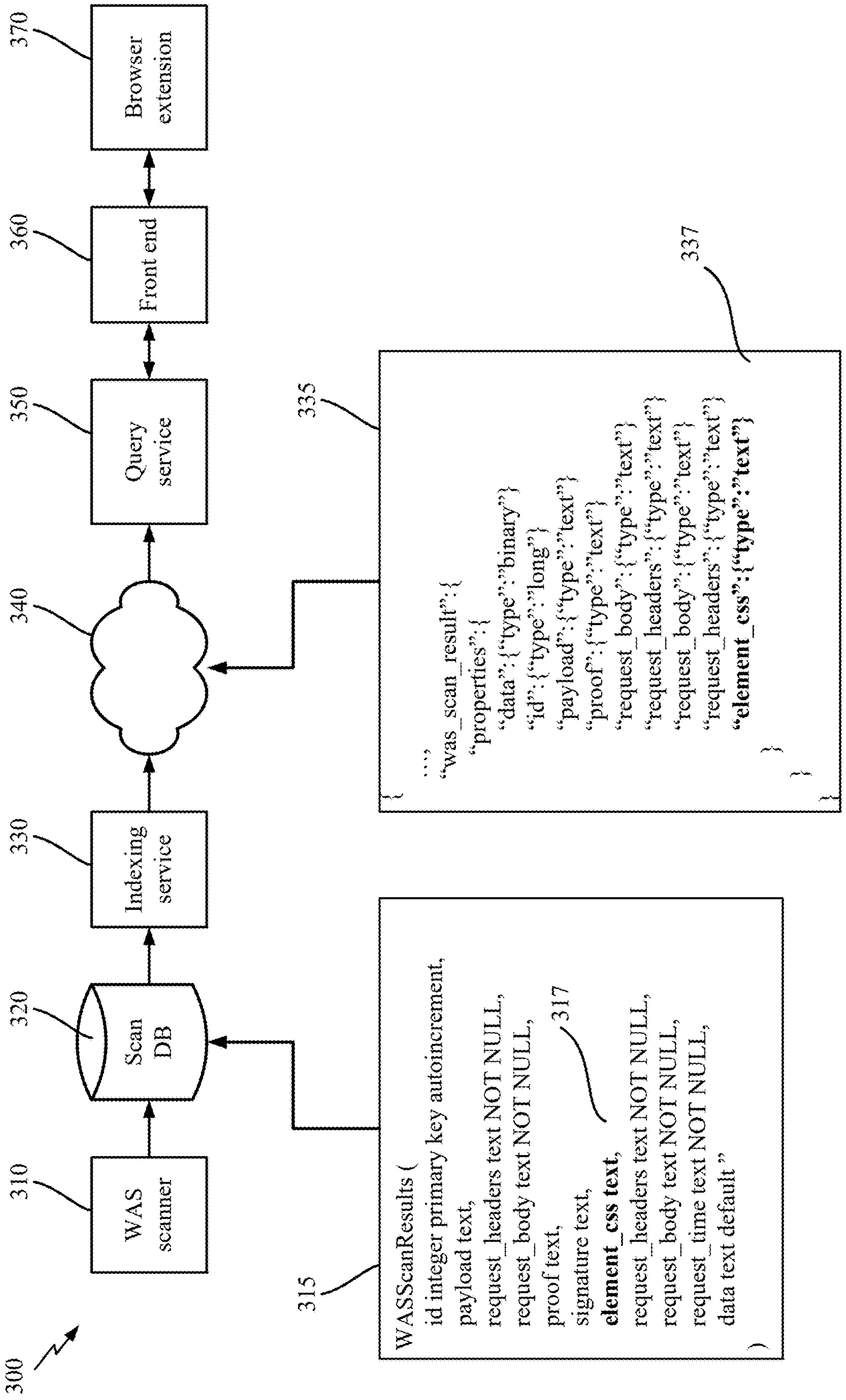
FIG. 3 illustrates a diagram of an example system suitable for interactive remediation of vulnerabilities of web applications based on scanning of web applications.

According to various aspects, FIG. 3 illustrates a diagram of an example system 300 suitable for interactive remediation of vulnerabilities of web applications based on scanning of web applications. In particular, as shown in FIG. 3, the system 300 may include a WAS scanner (or simply "scanner") 310, a scan results 320 (e.g., a database (DB)), a first cloud service 330, a search engine 340, a second cloud service 350, a front end 360, and a browser extension 370. The first and second cloud services 330, 350 may be a same cloud service or different cloud services.

Generally, the scanner 310 may include an element selector for the vulnerable element as a part of its result placed into the scan results 320. Examples (not necessarily exhaustive) of an element selector may include CSS selector, XPath selector, Node number selector, Name selector, Id selector, LinkText selector, and so on. This information may then be passed into the search engine 340 by the first cloud service 330 and included in results from the second cloud service 350 when queried for data about specific vulnerabilities, e.g., from the front end 360. If an element selector exists, the front end 360 (e.g., browser) may include a button that links back to the vulnerable URL and element.

The scanner 310 may be configured to scan web pages to identify one or more vulnerabilities of web applications, i.e., vulnerabilities of elements in web pages. In particular, the scanner 310 may include a selector (not shown) for the vulnerable element in the scan results 320. For example, the selector may implement a scanner function (selector create function) that will take the current element and produce an element selector from it. The URL the element appears on may be included as separate data. A final test may be run before including the data to ensure that the element can be gotten to or otherwise accessible without any extra browser steps that the system is unaware of. Such data may be kept in a table in the scan results 320. For example, FIG. 3 illustrates a VulnerabilitiesDetected table 315, which includes a field for an element selector 317 denoted as "element_css", which is of text type.

The first cloud service 330 may be configured to index the search results within scan results 320. In particular, the first cloud service 330 may be configured to ensure that the field for the element selector 317 is included when the search engine 340 performs a search. In FIG. 3, it is seen the "was_scan_results" 335 data includes the element selector data 337, which is denoted as "element_css":{"type": "text"}.

The second cloud service 350 may be configured to query the search engine 340 for results of WAS scanning, e.g., performed by the scanner 310. In particular, the second cloud service 350 may be configured to query the search engine 340 for the element selector data 337. For example, the second cloud service 350 may submit the following query to pick up the element selector data 337 and return its response, e.g., to the front end 360.

GET/Scans/{scanId}/Hosts/{hostId}/Plugins/{pluginId}

The front end 360 may be configured to receive the WAS scanning results data, including the element selector data for the vulnerable elements. The front end 360 may also be configured to include a button or some other visible element, which when activated (e.g., pressed by a user) will pass message to the browser extension 370 (e.g., chrome extension). The front end 360 may pass at least the following data in the message to the browser extension 370:

URL
Element selector
Plugin ID

The browser extension 370 may be configured to take the message passed from the front end 360, open the URL, and highlight and snap to the vulnerable element. In some aspects, the browser extension 370 may open the URL in a new tab of the browser.

Figure 4:
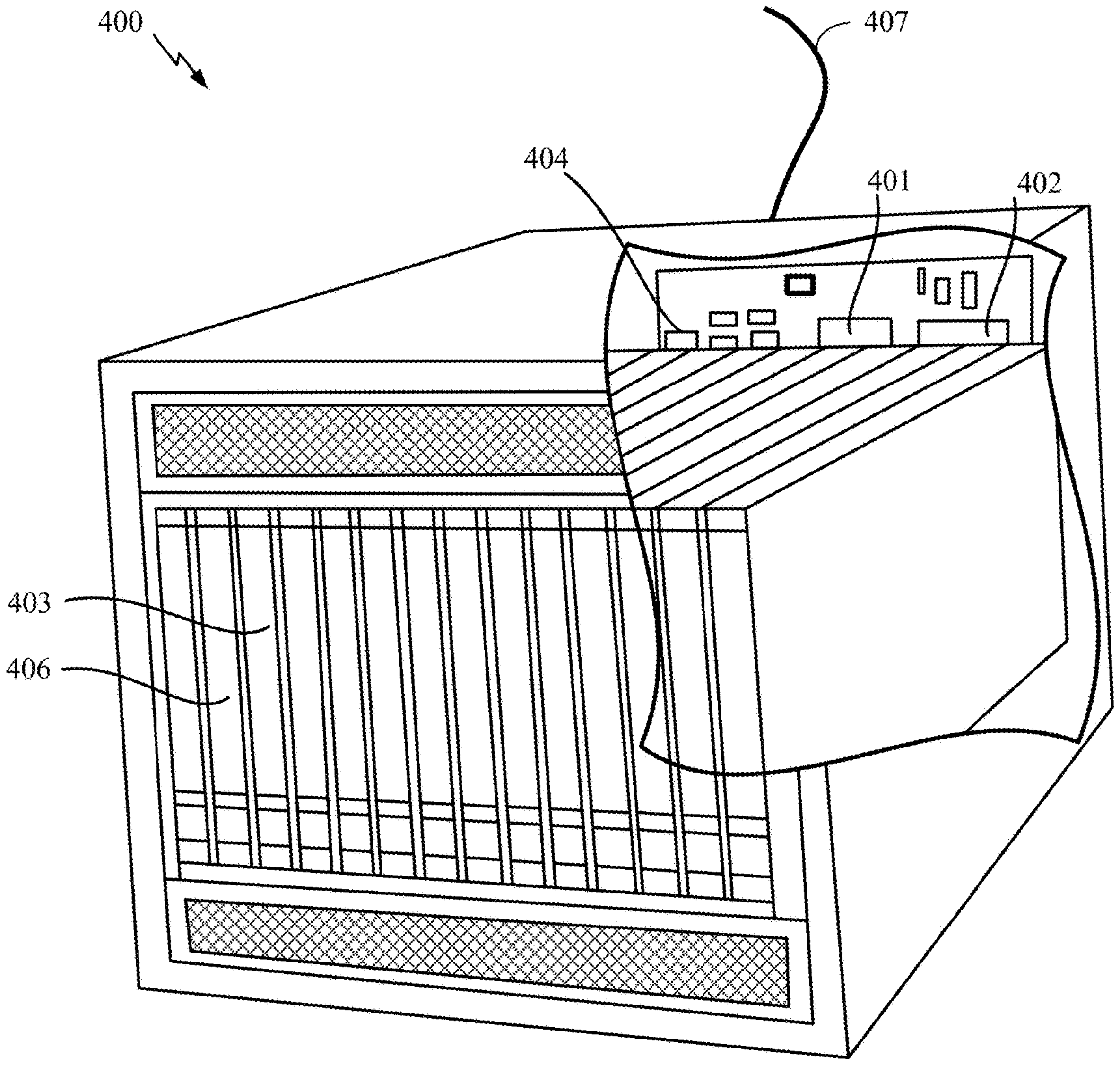
FIG. 4 illustrates a server, according to aspects of the disclosure.

The various embodiments may be implemented on any of a variety of commercially available server devices, such as server 400 illustrated in FIG. 4. In an example, the server 400 may correspond to one example configuration of a server on which a security auditing application may execute, which in certain implementations may be included as part of the vulnerability management system 150 of FIG. 1 or the vulnerability management system 250 of FIG. 2 or WAS scanner 300 of FIG. 3. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet.

Figure 5:
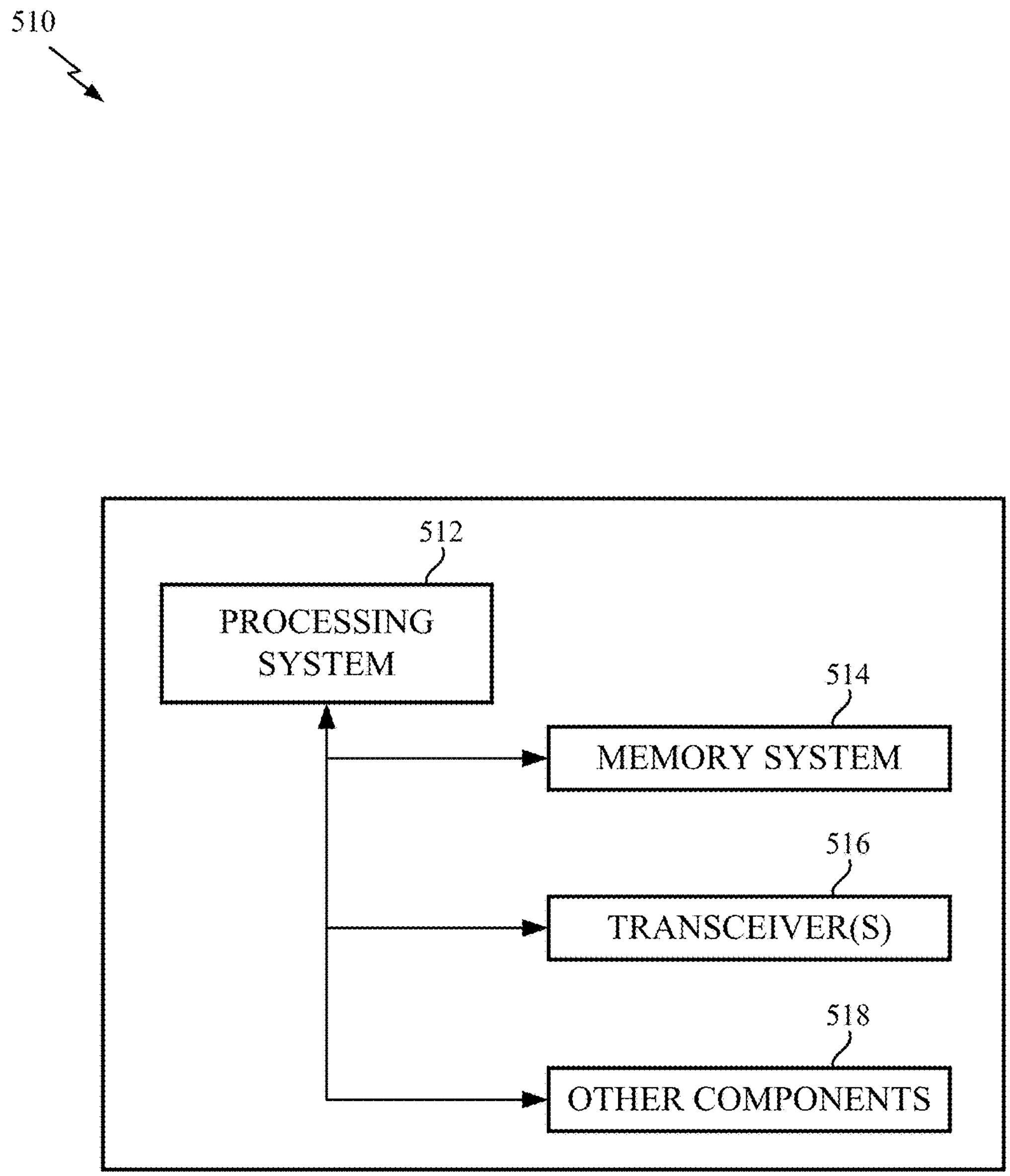
FIG. 5 generally illustrates a user equipment (UE) in accordance with aspects of the disclosure.

While FIG. 4 illustrates an example whereby a server-type apparatus 400 may implement various processes of the disclosure, in other aspects various aspects of the disclosure may execute on a user equipment (UE), such as UE 510 depicted in FIG. 5.

FIG. 5 generally illustrates a UE 510 in accordance with aspects of the disclosure. In some designs, UE 510 may correspond to any UE-type that is capable of executing the process(es) in accordance with aspects of the disclosure, including but not limited to a mobile phone or tablet computer, a laptop computer, a desktop computer, a wearable device (e.g., smart watch, etc.), and so on. The UE 510 depicted in FIG. 5 includes a processing system 512, a memory system 514, and at least one transceiver 516. The UE 510 may optionally include other components 518 (e.g., a graphics card, various communication ports, etc.).

Machine learning may be used to generate models that may be used to facilitate various aspects associated with processing of data. One specific application of machine learning relates to generation of measurement models for processing of reference signals for positioning (e.g., positioning reference signal (PRS)), such as feature extraction, reporting of reference signal measurements (e.g., selecting which extracted features to report), and so on.

Machine learning models are generally categorized as either supervised or unsupervised. A supervised model may further be sub-categorized as either a regression or classification model. Supervised learning involves learning a function that maps an input to an output based on example input-output pairs. For example, given a training dataset with two variables of age (input) and height (output), a supervised learning model could be generated to predict the height of a person based on their age. In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 6:
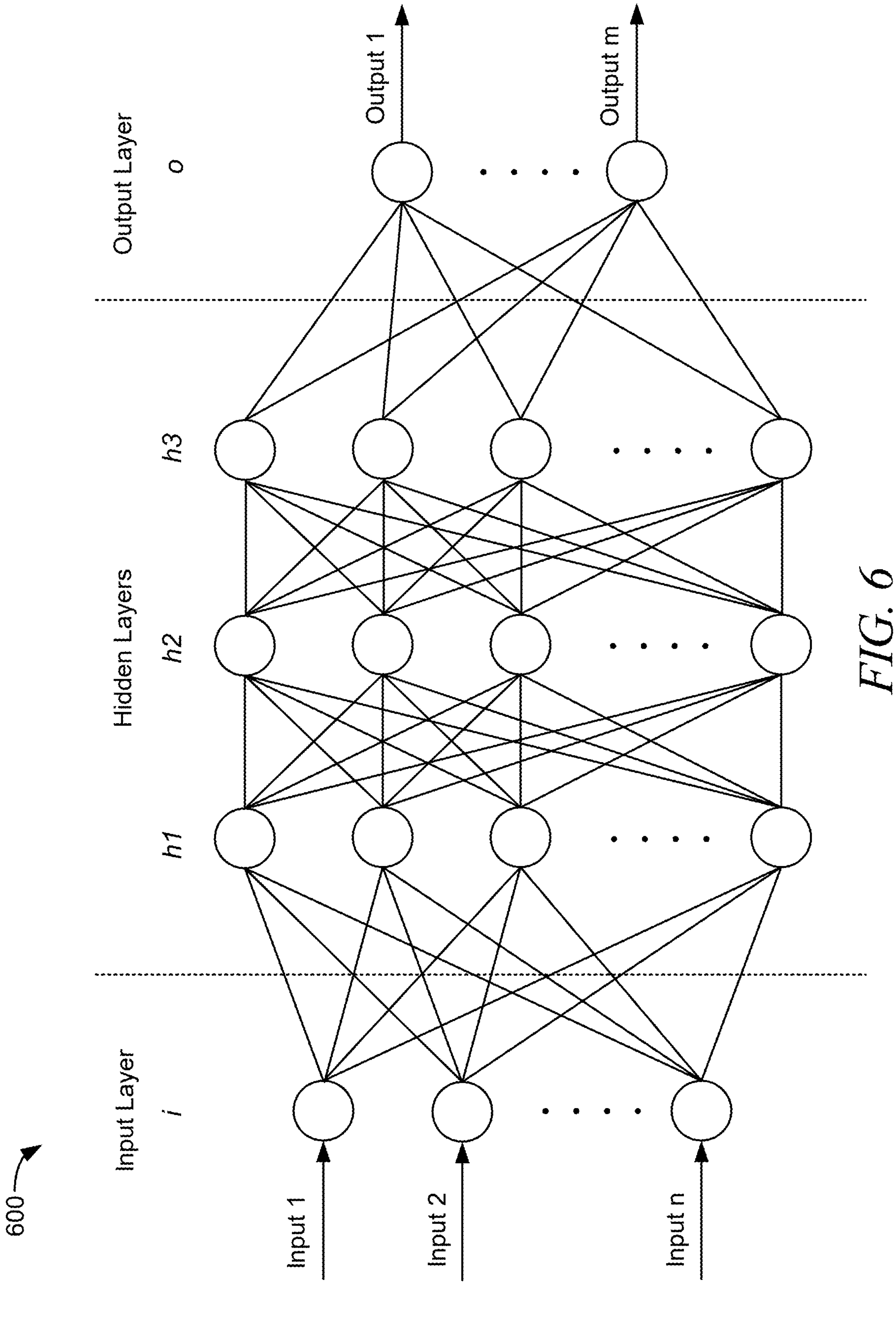
FIG. 6 illustrates an example neural network, according to aspects of the disclosure.

FIG. 6 illustrates an example neural network 600, according to aspects of the disclosure. The neural network 600 includes an input layer 'i' that receives 'n' (one or more) inputs (illustrated as "Input 1," "Input 2," and "Input n"), one or more hidden layers (illustrated as hidden layers 'h1,' 'h2,' and 'h3') for processing the inputs from the input layer, and an output layer 'o' that provides 'm' (one or more) outputs (labeled "Output 1" and "Output m"). The number of inputs 'n,' hidden layers 'h,' and outputs 'm' may be the same or different. In some designs, the hidden layers 'h' may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning module (e.g., implemented by a processing system) may be configured to iteratively analyze training input data (e.g., measurements of reference signals to/from various target UEs) and to associate this training input data with an output data set (e.g., a set of possible or likely candidate locations of the various target UEs), thereby enabling later determination of the same output data set when presented with similar input data (e.g., from other target UEs at the same or similar location).

Figure 7:
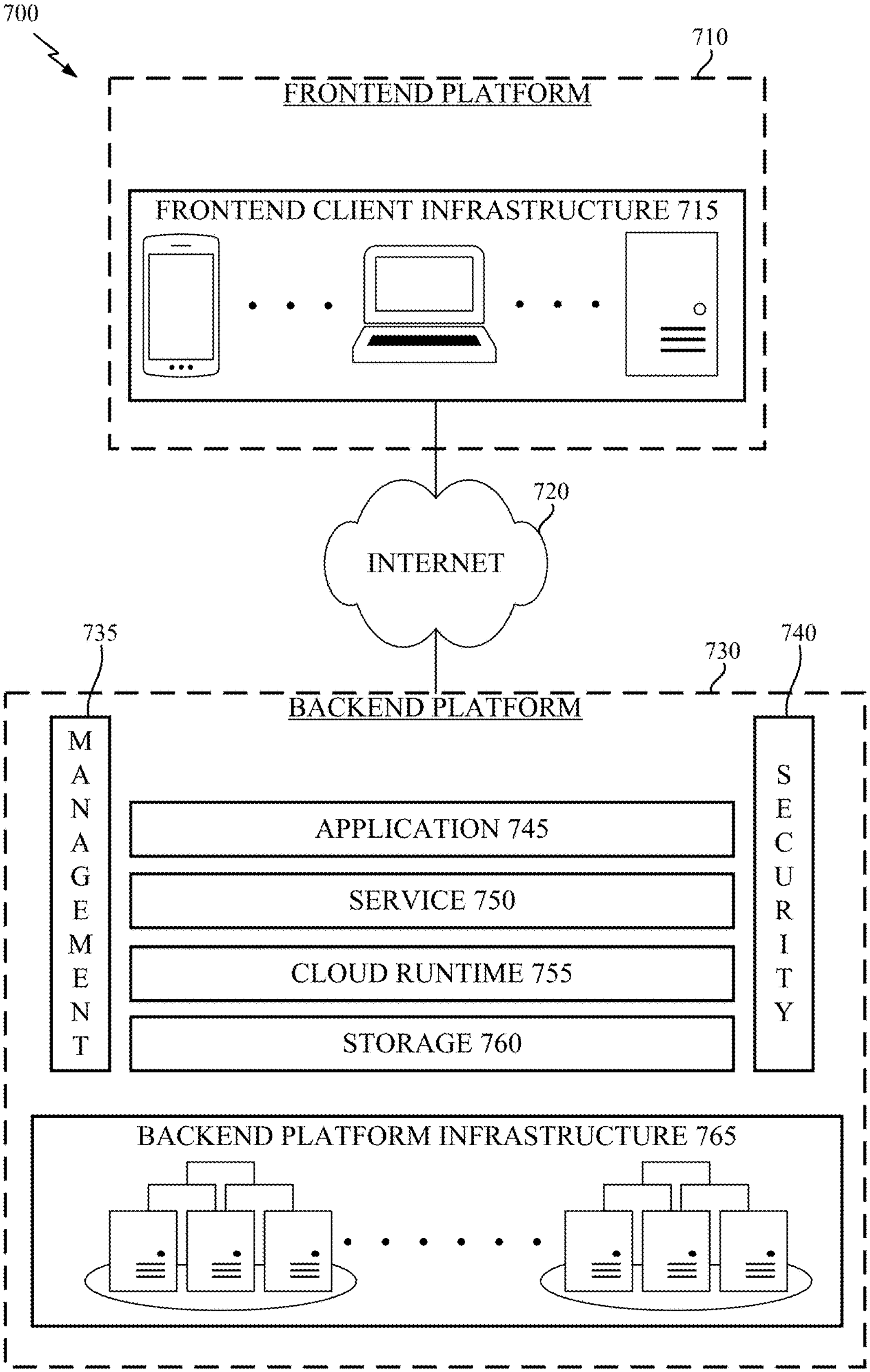
FIG. 7 illustrates cloud network architecture, in accordance with aspects of the disclosure.

FIG. 7 illustrates cloud network architecture 700, in accordance with aspects of the disclosure. The cloud network architecture 700 comprises a frontend platform 710, an Internet 720, and a backend platform 730. The frontend platform 710 comprises frontend client infrastructure 715, such as smartphones, laptop or desktop computers, and so on, for interfacing with clients (e.g., via web browsers, client applications, etc.). The backend platform 730 comprises a management function 735, a security function 740, an application function 745, a service function 750, a cloud runtime function 755, storage 760 and backend platform infrastructure 765 (e.g., a group of distributed and interconnected computing devices with shareable hardware and/or software resources that support distributed implementation of a set of cloud applications via a respective set of cloud resources).

Referring to FIG. 7, in cloud architecture, each of the components works together to create a cloud computing platform that provides users with on-demand access to resources and services. The backend platform 730 contains all the cloud computing resources, services 750, data storage 760, and applications 745 offered by a cloud service provider. A network, such as Internet 720, is used to connect the frontend platform 710 and backend cloud architecture components of the backend platform 730, facilitating data to be sent back and forth between them. When users interact with the frontend platform (or client-side interface), the user devices send queries to the backend platform 730 using middleware where the service model carries out the specific task or request.

The types of services available to use vary depending on the cloud-based delivery model or service model you have chosen. In some designs, there are three main cloud computing service models, e.g.:

- Infrastructure as a service (IaaS): This model provides on-demand access to cloud infrastructure, such as servers, storage, and networking. This eliminates the need to procure, manage, and maintain on-premises infrastructure.
- Platform as a service (PaaS): This model offers a computing platform with all the underlying infrastructure and software tools needed to develop, run, and manage applications.
- Software as a service (SaaS): This model offers cloud-based applications that are delivered and maintained by the service provider, eliminating the need for end users to deploy software locally.

In some designs, cloud architecture may also be characterized in terms of cloud architecture layers, e.g.:

- Hardware: The servers, storage, network devices, and other hardware that power the cloud.
- Virtualization: An abstraction layer that creates a virtual representation of physical computing and storage resources. This allows multiple applications to use the same resources.
- Application and service: This layer coordinates and supports requests from the frontend user interface, offering different services based on the cloud service model, from resource allocation to application development tools to web-based applications.

In some designs, various types of cloud architecture may be implemented, e.g.:

- Public cloud architecture uses cloud computing resources and physical infrastructure that is owned and operated by a third-party cloud service provider. Public clouds enable you to scale resources easily without having to invest in your own hardware or software, but use multi-tenant architectures that serve other customers at the same time.
- Private cloud architecture refers to a dedicated cloud that is owned and managed by your organization. It is privately hosted on-premises in your own data center, providing more control over resources and more security over data and infrastructure. However, this architecture is considerably more expensive and requires more IT expertise to maintain.
- Hybrid cloud architecture uses both public and private cloud architecture to deliver a flexible mix of cloud services. A hybrid cloud allows you to migrate workloads between environments, allowing you to use the services that best suit your business demands and the workload. Hybrid cloud architectures are often the solution of choice for businesses that need control over their data but also want to take advantage of public cloud offerings.
- Multicloud architecture uses cloud services from multiple cloud providers. Multicloud environments are gaining popularity for their flexibility and ability to better match use cases to specific offerings, regardless of vendor.

In some designs, components of cloud architecture include:

- Virtualization: Clouds are built upon the virtualization of servers, storage, and networks. Virtualized resources are a software-based, or virtual, representation of a physical resource such as servers or storage. This abstraction layer facilitates multiple applications to utilize the same physical resources, thereby increasing the efficiency of servers, storage, and networking throughout the enterprise.
- Infrastructure: loud infrastructure includes all the components of traditional data centers including servers, persistent storage, and networking gear including routers and switches.
- Middleware: As in traditional data centers, these software components such as databases and communications applications enable networked computers, applications, and software to communicate with each other.
- Management: These tools enable continuous monitoring of a cloud environment's performance and capacity. IT teams can track usage, deploy new apps, integrate data, and ensure disaster recovery, all from a single console.
- Automation software: The delivery of critical IT services through automation and pre-defined policies can significantly ease IT workloads, streamline application delivery, and reduce costs. In cloud architecture, automation is used to easily scale up system resources to accommodate a spike in demand for compute power, deploy applications to meet fluctuating market demands, or ensure governance across a cloud environment.

Figure 8:
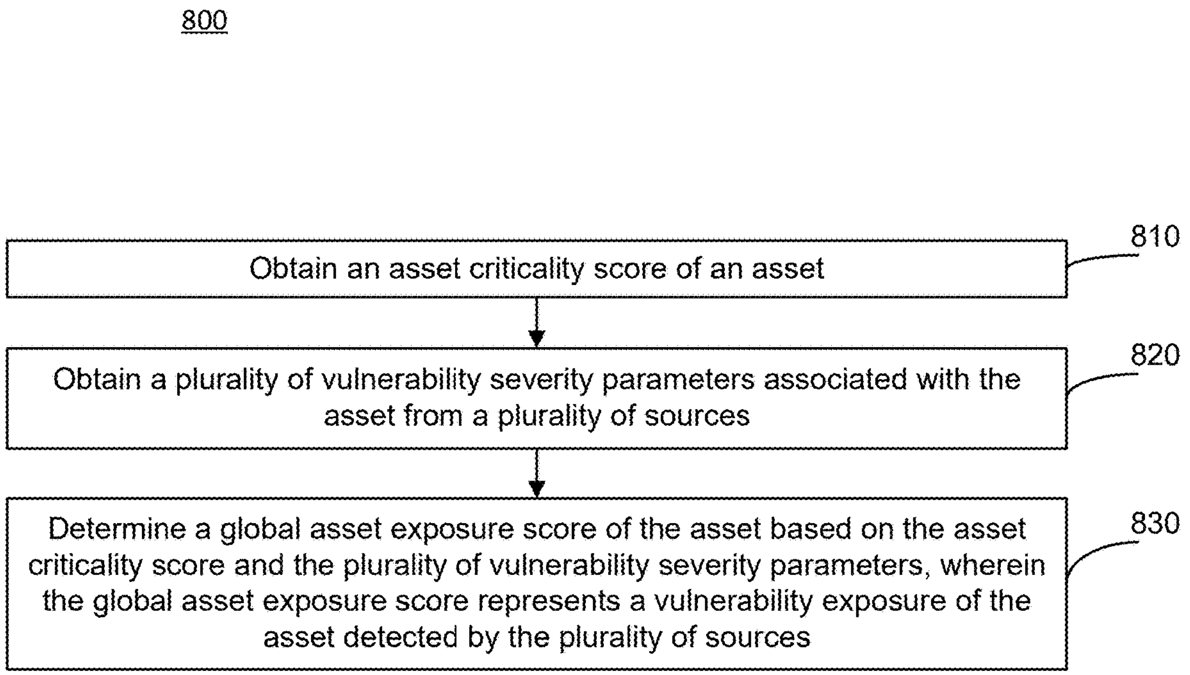
FIG. 8 illustrates a process, in accordance with aspects of the disclosure.

FIG. 8 illustrates a process 800, in accordance with aspects of the disclosure. The process 800 of FIG. 8 may be performed by a component, such as a network device 140, a network device 240, a query service 350, a server 400 or a UE 510.

Referring to FIG. 8, at 810, the component (e.g., network access ports 404, transceiver(s) 516, etc.) obtains an asset criticality score of an asset.

Referring to FIG. 8, at 820, the component (e.g., processor(s) 401, processing system 512, etc.) obtains a plurality of vulnerability severity parameters associated with the asset from a plurality of sources.

Referring to FIG. 8, at 830, the component (e.g., processor(s) 401, processing system 512, etc.) determines a global asset exposure score of the asset based on the asset criticality score and the plurality of vulnerability severity parameters, wherein the global asset exposure score represents a vulnerability exposure of the asset detected by the plurality of sources.

In some designs, the component further determines a linear component based on the plurality of vulnerability severity parameters, and further determines a vulnerability density score of the asset based on the linear component, wherein the global asset exposure score is determined based at least in part on the vulnerability density score.

In some designs, the component further divides the linear component by a sum of the linear component and one to obtain the vulnerability density score.

In some designs, the component further determines a geometric mean of the asset criticality score and the vulnerability density score.

In some designs, the component further multiplies the geometric mean by a scale factor to obtain the global asset exposure score.

In some designs, the component further determines a source-specific linear component for each of the plurality of sources, wherein the source-specific linear component is a weighted sum of a plurality of source-specific vulnerability severity parameters for each of the plurality of sources.

In some designs, the plurality of source-specific vulnerability severity parameters for each of the plurality of sources is classified by a plurality of levels of vulnerability severity.

In some designs, the plurality of source-specific vulnerability severity parameters for each of the plurality of sources comprises a low-vulnerability severity parameter, a medium-vulnerability severity parameter, a high-vulnerability severity parameter, and a critical-vulnerability severity parameter.

In some designs, the component further determines a source-specific vulnerability density score for each of the plurality of sources.

In some designs, the component further divides the source-specific linear component by a sum of the source-specific linear component and one to obtain the source-specific vulnerability density score.

In some designs, the component further determines a source-specific asset exposure score for each of the plurality of sources based on the source-specific vulnerability density score and the asset criticality score.

In some designs, the component further determines a geometric mean of the asset criticality score and the source-specific vulnerability density score.

In some designs, the component further multiplies the geometric mean by a scale factor to obtain the source-specific asset exposure score.

In some designs, the global asset exposure score is greater than the source-specific asset exposure score for each of the plurality of sources.

In some designs, the component further determines a global cyber exposure score representing a vulnerability exposure of a plurality of assets to cyber-attacks due to vulnerabilities detected by the plurality of sources based on an average of a plurality of global asset exposure scores for the plurality of assets.

In some designs, the plurality of sources comprise a plurality of vulnerability sensors.

In some designs, the plurality of sources comprise one or more software vulnerabilities, one or more cloud misconfigurations; one or more account misconfigurations; or any combination thereof.

Although FIG. 8 shows example blocks of process 800, in some implementations, process 800 may include additional blocks, fewer blocks, different blocks, or differently arranged blocks from those depicted in FIG. 8. Additionally, or alternatively, two or more of the blocks of process 800 may be performed in parallel, or performed in a sequence different from the sequence depicted in FIG. 8.

Under existing data models, each asset may only have one type of finding, e.g. software vulnerabilities from a software vulnerability management tool or cloud misconfigurations from a cloud security management tool. Each receives an asset criticality score (ACR) based on a separate ACR model tailored to each finding source (e.g., each type of vulnerability management tool). In some aspects, the vulnerability density for each asset may be calculated by computing a linear component (L) which is the sum of some weights (β) multiplied by the number of findings of each severity (n):

$$L = \beta_{low} n_{low} + \beta_{medium} n_{medium} + \beta_{high} n_{high} + \beta_{critical} n_{critical}$$

where $n_{low}$ is the number of findings of low severity vulnerabilities, $\beta_{low}$ is the weight assigned to low severity vulnerabilities, $n_{medium}$ is the number of findings of medium severity vulnerabilities, $\beta_{medium}$ is the weight assigned to medium severity vulnerabilities, $n_{high}$ is the number of findings of high severity vulnerabilities, $\beta_{high}$ is the weight assigned to high severity vulnerabilities, $n_{critical}$ is the number of findings of critical severity vulnerabilities, and $\beta_{critical}$ is the weight assigned to critical severity vulnerabilities.

Although the above example describes categorization of vulnerabilities into low, medium, high and critical levels of vulnerability, the vulnerability levels may be classified in various manners according to aspects of the disclosure. For example, more than four or fewer than four levels of vulnerability may be provided for deriving the linear component L.

In some aspects, the severity of each finding may be determined by a scoring system (e.g., a vulnerability priority rating). In some aspects, L may take any value between zero and infinity. In some aspects, the vulnerability density score for each asset, which is bound to be between 0 and 1, may be calculated according to the following relationship:

$$VD = \frac{L}{1 + L}$$

where VD is the vulnerability density score and L is the linear component described above.

In some aspects, the asset exposure score (AES) may be the geometric mean of the ACR (scaled to a value between 0 and 1) and the vulnerability density, multiplied by 1000. In some aspects, the AES may take a value between 0 and 1000:

$$AES = 1000\sqrt{ACR * VD}$$

In some aspects, the cyber exposure score (CES) may be a collective score for a group of assets or a score for the customer's environment as a whole. In some aspects, the CES may be the average of all the AESs in the relevant group.

Figure 9:
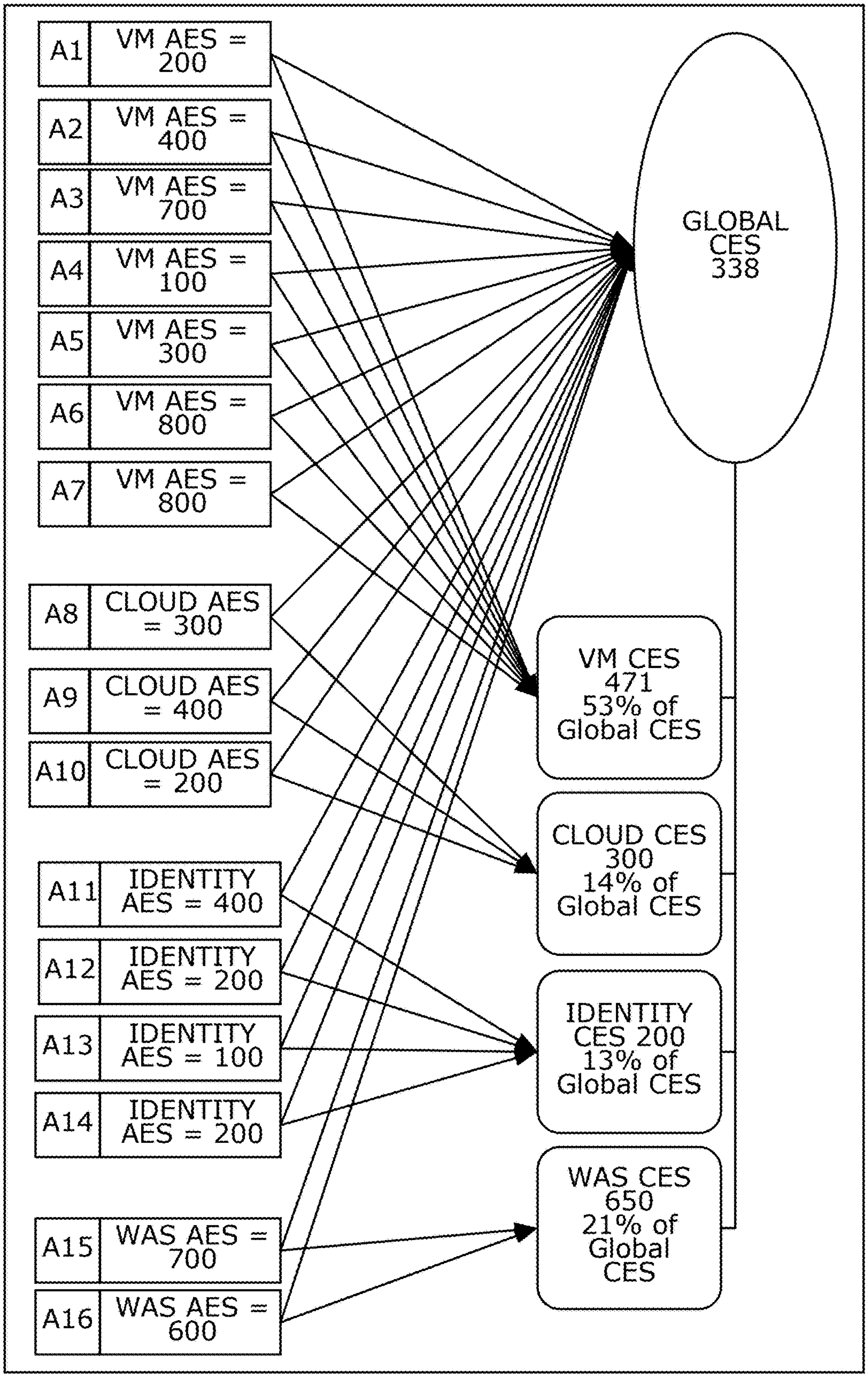
FIG. 9 illustrates an example scoring system, where each asset has a single asset exposure score (AES) based on a finding from a single source, according to aspects of the disclosure.

FIG. 9 illustrates an example scoring system, where each asset has a single asset exposure score (AES) based on a finding from a single source, according to aspects of the disclosure. In the example illustrated in FIG. 9, each box on the left of the figure represents an asset (e.g., assets denoted as "A1" through "A16"). In this example, each asset has a single AES based on findings from a single source.

In some aspects, a new data model may make it possible for findings detected by multiple sensors or ingested from one or more third-party data sources to be attributed to the same asset. In some aspects, the scoring model as illustrated in FIG. 9 may be extended to allow findings from multiple sensors or multiple sources to contribute to the AES of a single asset. In some aspects, each asset may have an ACR as before. In some aspects, there may only be one ACR per asset even in cases where an asset has findings from multiple sources. In some aspects, the same scoring framework described above may be used to derive the AES for each source individually, but extended for findings from multiple sensors or multiple sources.

In some aspects, for each finding source (p) on an asset, a linear component $L_p$ may be calculated as the sum of weights multiplied by the number of findings of each severity (e.g., software vulnerabilities), according to the following relationship:

$$L_p = \beta_{p,lo} n_{p,lo} + \beta_{p,med} n_{p,med} + \beta_{p,crit} n_{p,crit}$$

where $n_{p,lo}$ is the number of findings of low vulnerability for source p, $\beta_{p.lo}$ is the weight assigned to low severity vulnerabilities for source p, $n_{p,med}$ is the number of findings of medium severity vulnerabilities for source p, $\beta_{p,med}$ is the weight assigned to medium severity vulnerabilities for source p, $n_{p,hi}$ is the number of findings of high severity vulnerabilities for source p, $\beta_{p,hi}$ is the weight assigned to high vulnerability for source P, $n_{p,crit}$ is the number of findings of critical vulnerability for source p, and $\beta_{p,crit}$ is the weight assigned to critical vulnerability for source p.

Although the above example describes categorization of vulnerabilities into low, medium, high and critical levels of vulnerability, the vulnerability levels may be classified in various manners according to aspects of the disclosure. For example, more than four or fewer than four levels of vulnerability may be provided for deriving the linear component for each finding source.

In some aspects, the vulnerability density score $VD_p$ for source p may be derived as follows:

$$VD_p = \frac{L_p}{1 + L_p}$$

The AES ($AES_p$) for source p is:

$$AES_p = 1000\sqrt{ACR * VD_p}$$

In some aspects, an asset may have multiple AESs depending on the number of sources, p, that have scanned the asset. In some aspects, the global AES may calculated by combining the information from each source by first calculating a unified linear component by adding together the linear components for each source p:

$$L = \sum_p L_p$$

In some aspects, the global vulnerability density may be determined as follows:

$$VD = \frac{L}{1 + L}$$

In some aspects, the global AES may be calculated as the geometric mean of the ACR and the global vulnerability density multiplied by 1000:

$$AES = 1000\sqrt{ACR * VD}$$

In some aspects, there is an AES for each source of finding observed on the asset and also a unified AES that captures the total exposure. In some aspects, constructed in this manner, the global AES is always greater than the maximum of the AES for each source p:

$$AES > \text{Max}_p(AES_p)$$

The global AES may be determined in various manners according to aspects of the disclosure. For example, instead of calculating the global AES in the manner described above, the global AES may be calculated as the average of all AESs across all sources p. In that case, the global AES would not be greater than the maximum of each source-specific AES.

Since each asset has an AES for each source, a cyber exposure score (CES) may be determined for each source (e.g., vulnerability management (VM) CES, cloud CES, identity CES, web application server (WAS) CES, etc.). In some aspects, a global CES may be calculated as the average of global AESs of multiple assets, since each global AES accounts for all vulnerabilities found on each asset from all sources. In some implementations, a source-specific CES (where the source may be a VM, WAS, cloud, identity, etc.) may represent the average risk with respect to that source, whereas the global CES may represent the average overall risk to cyber exposure, taking into account the vulnerabilities of all sources. This may be advantageous for corporate customers as it may often be the case that different teams within a company may be responsible for different aspects of security.

In some aspects, having a separate CES for each source may allow each security team to assess its progress in the area(s) for which it is responsible. In some aspects, these source-specific scores may be benchmarked against their peers. In contrast, the global CES may provide an overall assessment of exposure.

Figure 10:
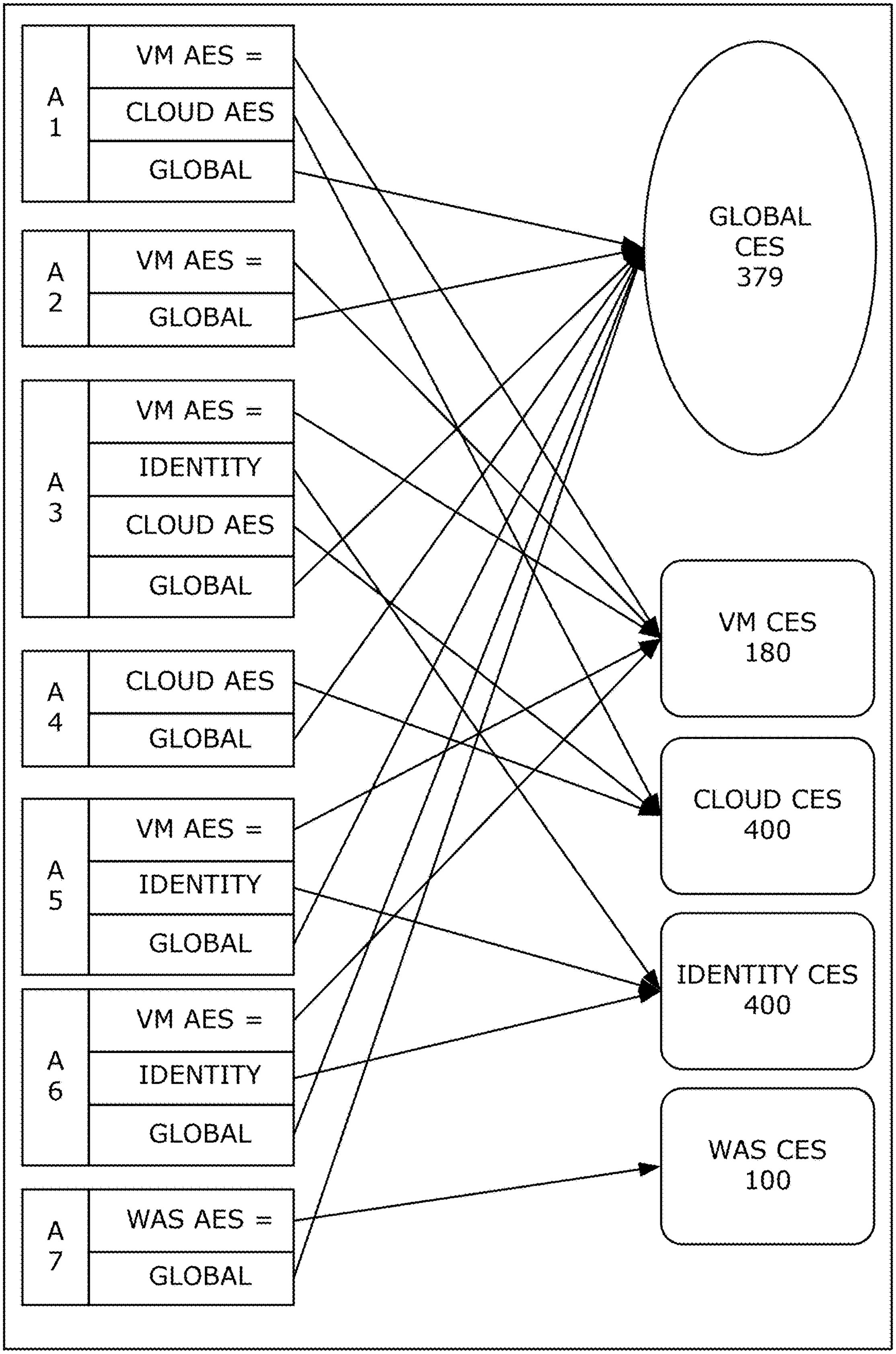
FIG. 10 illustrates an example scoring system for calculating a global cyber exposure score (CES) and source-specific CESs, where each asset has a global AES and at least one source-specific AES, according to aspects of the disclosure.

FIG. 10 illustrates an example scoring system for calculating a global CES and source-specific CESs, where each asset has a global AES and at least one source-specific AES, according to aspects of the disclosure. In the example illustrated in FIG. 10, each box on the left of the figure represents an asset (e.g., assets denoted as "A1" through "A7"). In this example, each asset has at least two AESs, including a global AES and one or more source-specific AESs (e.g., VM AES, cloud AES, identity AES, and/or WAS AES).

In the detailed description above, it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method, performed by a device, comprising: obtaining an asset criticality score of an asset; obtaining a plurality of vulnerability severity parameters associated with the asset from a plurality of sources; and determining a global asset exposure score of the asset based on the asset criticality score and the plurality of vulnerability severity parameters, wherein the global asset exposure score represents a vulnerability exposure of the asset detected by the plurality of sources.

Clause 2. The method of clause 1, further comprising: determining a linear component based on the plurality of vulnerability severity parameters; and determining a vulnerability density score of the asset based on the linear component, wherein the global asset exposure score is determined based at least in part on the vulnerability density score.

Clause 3. The method of clause 2, wherein determining the vulnerability density score comprises: dividing the linear component by a sum of the linear component and one to obtain the vulnerability density score.

Clause 4. The method of any of clauses 2 to 3, wherein determining the global asset exposure score comprises: determining a geometric mean of the asset criticality score and the vulnerability density score.

Clause 5. The method of clause 4, wherein determining the global asset exposure score further comprises: multiplying the geometric mean by a scale factor to obtain the global asset exposure score.

Clause 6. The method of any of clauses 2 to 5, wherein determining the linear component comprises: determining a source-specific linear component for each of the plurality of sources, wherein the source-specific linear component is a weighted sum of a plurality of source-specific vulnerability severity parameters for each of the plurality of sources.

Clause 7. The method of clause 6, wherein the plurality of source-specific vulnerability severity parameters for each of the plurality of sources is classified by a plurality of levels of vulnerability severity.

Clause 8. The method of clause 7, wherein the plurality of source-specific vulnerability severity parameters for each of the plurality of sources comprises a low-vulnerability severity parameter, a medium-vulnerability severity parameter, a high-vulnerability severity parameter, and a critical-vulnerability severity parameter.

Clause 9. The method of any of clauses 6 to 8, further comprising: determining a source-specific vulnerability density score for each of the plurality of sources.

Clause 10. The method of any of clauses 8 to 9, wherein determining the source-specific vulnerability density score comprises: dividing the source-specific linear component by a sum of the source-specific linear component and one to obtain the source-specific vulnerability density score.

Clause 11. The method of any of clauses 8 to 10, further comprising: determining a source-specific asset exposure score for each of the plurality of sources based on the source-specific vulnerability density score and the asset criticality score.

Clause 12. The method of any of clauses 10 to 11, wherein determining the source-specific asset exposure score comprises: determining a geometric mean of the asset criticality score and the source-specific vulnerability density score.

Clause 13. The method of any of clauses 11 to 12, wherein determining the source-specific asset exposure score further comprises: multiplying the geometric mean by a scale factor to obtain the source-specific asset exposure score.

Clause 14. The method of any of clauses 10 to 13, wherein the global asset exposure score is greater than the source-specific asset exposure score for each of the plurality of sources.

Clause 15. The method of any of clauses 10 to 14, further comprising: determining a global cyber exposure score representing a vulnerability exposure of a plurality of assets to cyber-attacks due to vulnerabilities detected by the plurality of sources based on an average of a plurality of global asset exposure scores for the plurality of assets.

Clause 16. The method of any of clauses 10 to 15, further comprising: determining a source-specific cyber exposure score representing a vulnerability exposure of a plurality of assets to cyber-attacks due to vulnerabilities detected by a single source based on an average of a plurality of asset exposure scores for the plurality of assets with respect to the single source.

Clause 17. The method of any of clauses 1 to 16, wherein the plurality of sources comprise a plurality of vulnerability sensors.

Clause 18. The method of any of clauses 1 to 17, wherein the plurality of sources comprise: one or more software vulnerabilities; one or more cloud misconfigurations; one or more account misconfigurations; or any combination thereof.

Clause 19. A component, comprising: one or more memories; and one or more processors communicatively coupled to the one or more memories, the one or more processors, either alone or in combination, configured to: obtain an asset criticality score of an asset; obtain a plurality of vulnerability severity parameters associated with the asset from a plurality of sources; and determine a global asset exposure score of the asset based on the asset criticality score and the plurality of vulnerability severity parameters, wherein the global asset exposure score represents a vulnerability exposure of the asset detected by the plurality of sources.

Clause 20. The component of clause 19, wherein the one or more processors, either alone or in combination, are further configured to: determine a linear component based on the plurality of vulnerability severity parameters; and determine a vulnerability density score of the asset based on the linear component, wherein the global asset exposure score is determined based at least in part on the vulnerability density score.

Clause 21. The component of clause 20, wherein the one or more processors configured to determine the vulnerability density score comprise the one or more processors, either alone or in combination, configured to: divide the linear component by a sum of the linear component and one to obtain the vulnerability density score.

Clause 22. The component of any of clauses 20 to 21, wherein the one or more processors configured to determine the global asset exposure score comprise the one or more processors, either alone or in combination, configured to: determine a geometric mean of the asset criticality score and the vulnerability density score.

Clause 23. The component of clause 22, wherein the one or more processors configured to determine the global asset exposure score comprise the one or more processors, either alone or in combination, configured to: multiply the geometric mean by a scale factor to obtain the global asset exposure score.

Clause 24. The component of any of clauses 20 to 23, wherein the one or more processors configured to determine the linear component comprise the one or more processors, either alone or in combination, configured to: determine a source-specific linear component for each of the plurality of sources, wherein the source-specific linear component is a weighted sum of a plurality of source-specific vulnerability severity parameters for each of the plurality of sources.

Clause 25. The component of clause 24, wherein the plurality of source-specific vulnerability severity parameters for each of the plurality of sources is classified by a plurality of levels of vulnerability severity.

Clause 26. The component of clause 25, wherein the plurality of source-specific vulnerability severity parameters for each of the plurality of sources comprises a low-vulnerability severity parameter, a medium-vulnerability severity parameter, a high-vulnerability severity parameter, and a critical-vulnerability severity parameter.

Clause 27. The component of any of clauses 24 to 26, wherein the one or more processors, either alone or in combination, are further configured to: determine a source-specific vulnerability density score for each of the plurality of sources.

Clause 28. The component of any of clauses 26 to 27, wherein the one or more processors configured to determine the source-specific vulnerability density score comprise the one or more processors, either alone or in combination, configured to: divide the source-specific linear component by a sum of the source-specific linear component and one to obtain the source-specific vulnerability density score.

Clause 29. The component of any of clauses 26 to 28, wherein the one or more processors, either alone or in combination, are further configured to: determine a source-specific asset exposure score for each of the plurality of sources based on the source-specific vulnerability density score and the asset criticality score.

Clause 30. The component of any of clauses 28 to 29, wherein the one or more processors configured to determine the source-specific asset exposure score comprise the one or more processors, either alone or in combination, configured to: determine a geometric mean of the asset criticality score and the source-specific vulnerability density score.

Clause 31. The component of any of clauses 29 to 30, wherein the one or more processors configured to determine the source-specific asset exposure score comprise the one or more processors, either alone or in combination, configured to: multiply the geometric mean by a scale factor to obtain the source-specific asset exposure score.

Clause 32. The component of any of clauses 28 to 31, wherein the global asset exposure score is greater than the source-specific asset exposure score for each of the plurality of sources.

Clause 33. The component of any of clauses 28 to 32, wherein the one or more processors, either alone or in combination, are further configured to: determine a global cyber exposure score representing a vulnerability exposure of a plurality of assets to cyber-attacks due to vulnerabilities detected by the plurality of sources based on an average of a plurality of global asset exposure scores for the plurality of assets.

Clause 34. The component of any of clauses 28 to 33, wherein the one or more processors, either alone or in combination, are further configured to: determine a source-specific cyber exposure score representing a vulnerability exposure of a plurality of assets to cyber-attacks due to vulnerabilities detected by a single source based on an average of a plurality of asset exposure scores for the plurality of assets with respect to the single source.

Clause 35. The component of any of clauses 19 to 34, wherein the plurality of sources comprise a plurality of vulnerability sensors.

Clause 36. The component of any of clauses 19 to 35, wherein the plurality of sources comprise: one or more software vulnerabilities; one or more cloud misconfigurations; one or more account misconfigurations; or any combination thereof.

Clause 37. A component, comprising: means for obtaining an asset criticality score of an asset; means for obtaining a plurality of vulnerability severity parameters associated with the asset from a plurality of sources; and means for determining a global asset exposure score of the asset based on the asset criticality score and the plurality of vulnerability severity parameters, wherein the global asset exposure score represents a vulnerability exposure of the asset detected by the plurality of sources.

Clause 38. The component of clause 37, further comprising: means for determining a linear component based on the plurality of vulnerability severity parameters; and means for determining a vulnerability density score of the asset based on the linear component, wherein the global asset exposure score is determined based at least in part on the vulnerability density score.

Clause 39. The component of clause 38, wherein the means for determining the vulnerability density score comprises: means for dividing the linear component by a sum of the linear component and one to obtain the vulnerability density score.

Clause 40. The component of any of clauses 38 to 39, wherein the means for determining the global asset exposure score comprises: means for determining a geometric mean of the asset criticality score and the vulnerability density score.

Clause 41. The component of clause 40, wherein the means for determining the global asset exposure score further comprises: means for multiplying the geometric mean by a scale factor to obtain the global asset exposure score.

Clause 42. The component of any of clauses 38 to 41, wherein the means for determining the linear component comprises: means for determining a source-specific linear component for each of the plurality of sources, wherein the source-specific linear component is a weighted sum of a plurality of source-specific vulnerability severity parameters for each of the plurality of sources.

Clause 43. The component of clause 42, wherein the plurality of source-specific vulnerability severity parameters for each of the plurality of sources is classified by a plurality of levels of vulnerability severity.

Clause 44. The component of clause 43, wherein the plurality of source-specific vulnerability severity parameters for each of the plurality of sources comprises a low-vulnerability severity parameter, a medium-vulnerability severity parameter, a high-vulnerability severity parameter, and a critical-vulnerability severity parameter.

Clause 45. The component of any of clauses 42 to 44, further comprising: means for determining a source-specific vulnerability density score for each of the plurality of sources.

Clause 46. The component of any of clauses 44 to 45, wherein the means for determining the source-specific vulnerability density score comprises: means for dividing the source-specific linear component by a sum of the source-specific linear component and one to obtain the source-specific vulnerability density score.

Clause 47. The component of any of clauses 44 to 46, further comprising: means for determining a source-specific asset exposure score for each of the plurality of sources based on the source-specific vulnerability density score and the asset criticality score.

Clause 48. The component of any of clauses 46 to 47, wherein the means for determining the source-specific asset exposure score comprises: means for determining a geometric mean of the asset criticality score and the source-specific vulnerability density score.

Clause 49. The component of any of clauses 47 to 48, wherein the means for determining the source-specific asset exposure score further comprises: means for multiplying the geometric mean by a scale factor to obtain the source-specific asset exposure score.

Clause 50. The component of any of clauses 46 to 49, wherein the global asset exposure score is greater than the source-specific asset exposure score for each of the plurality of sources.

Clause 51. The component of any of clauses 46 to 50, further comprising: means for determining a global cyber exposure score representing a vulnerability exposure of a plurality of assets to cyber-attacks due to vulnerabilities detected by the plurality of sources based on an average of a plurality of global asset exposure scores for the plurality of assets.

Clause 52. The component of any of clauses 46 to 51, further comprising: means for determining a source-specific cyber exposure score representing a vulnerability exposure of a plurality of assets to cyber-attacks due to vulnerabilities detected by a single source based on an average of a plurality of asset exposure scores for the plurality of assets with respect to the single source.

Clause 53. The component of any of clauses 37 to 52, wherein the plurality of sources comprise a plurality of vulnerability sensors.

Clause 54. The component of any of clauses 37 to 53, wherein the plurality of sources comprise: one or more software vulnerabilities; one or more cloud misconfigurations; one or more account misconfigurations; or any combination thereof.

Clause 55. A non-transitory computer-readable medium storing computer-executable instructions that, when executed by a component, cause the component to: obtain an asset criticality score of an asset; obtain a plurality of vulnerability severity parameters associated with the asset from a plurality of sources; and determine a global asset exposure score of the asset based on the asset criticality score and the plurality of vulnerability severity parameters, wherein the global asset exposure score represents a vulnerability exposure of the asset detected by the plurality of sources.

Clause 56. The non-transitory computer-readable medium of clause 55, further comprising computer-executable instructions that, when executed by the component, cause the component to: determine a linear component based on the plurality of vulnerability severity parameters; and determine a vulnerability density score of the asset based on the linear component, wherein the global asset exposure score is determined based at least in part on the vulnerability density score.

Clause 57. The non-transitory computer-readable medium of clause 56, wherein the computer-executable instructions that, when executed by the component, cause the component to determine the vulnerability density score comprise computer-executable instructions that, when executed by the component, cause the component to: divide the linear component by a sum of the linear component and one to obtain the vulnerability density score.

Clause 58. The non-transitory computer-readable medium of any of clauses 56 to 57, wherein the computer-executable instructions that, when executed by the component, cause the component to determine the global asset exposure score comprise computer-executable instructions that, when executed by the component, cause the component to: determine a geometric mean of the asset criticality score and the vulnerability density score.

Clause 59. The non-transitory computer-readable medium of clause 58, wherein the computer-executable instructions that, when executed by the component, cause the component to determine the global asset exposure score comprise computer-executable instructions that, when executed by the component, cause the component to: multiply the geometric mean by a scale factor to obtain the global asset exposure score.

Clause 60. The non-transitory computer-readable medium of any of clauses 56 to 59, wherein the computer-executable instructions that, when executed by the component, cause the component to determine the linear component comprise computer-executable instructions that, when executed by the component, cause the component to: determine a source-specific linear component for each of the plurality of sources, wherein the source-specific linear component is a weighted sum of a plurality of source-specific vulnerability severity parameters for each of the plurality of sources.

Clause 61. The non-transitory computer-readable medium of clause 60, wherein the plurality of source-specific vulnerability severity parameters for each of the plurality of sources is classified by a plurality of levels of vulnerability severity.

Clause 62. The non-transitory computer-readable medium of clause 61, wherein the plurality of source-specific vulnerability severity parameters for each of the plurality of sources comprises a low-vulnerability severity parameter, a medium-vulnerability severity parameter, a high-vulnerability severity parameter, and a critical-vulnerability severity parameter.

Clause 63. The non-transitory computer-readable medium of any of clauses 60 to 62, further comprising computer-executable instructions that, when executed by the component, cause the component to: determine a source-specific vulnerability density score for each of the plurality of sources.

Clause 64. The non-transitory computer-readable medium of any of clauses 62 to 63, wherein the computer-executable instructions that, when executed by the component, cause the component to determine the source-specific vulnerability density score comprise computer-executable instructions that, when executed by the component, cause the component to: divide the source-specific linear component by a sum of the source-specific linear component and one to obtain the source-specific vulnerability density score.

Clause 65. The non-transitory computer-readable medium of any of clauses 62 to 64, further comprising computer-executable instructions that, when executed by the component, cause the component to: determine a source-specific asset exposure score for each of the plurality of sources based on the source-specific vulnerability density score and the asset criticality score.

Clause 66. The non-transitory computer-readable medium of any of clauses 64 to 65, wherein the computer-executable instructions that, when executed by the component, cause the component to determine the source-specific asset exposure score comprise computer-executable instructions that, when executed by the component, cause the component to: determine a geometric mean of the asset criticality score and the source-specific vulnerability density score.

Clause 67. The non-transitory computer-readable medium of any of clauses 65 to 66, wherein the computer-executable instructions that, when executed by the component, cause the component to determine the source-specific asset exposure score comprise computer-executable instructions that, when executed by the component, cause the component to: multiply the geometric mean by a scale factor to obtain the source-specific asset exposure score.

Clause 68. The non-transitory computer-readable medium of any of clauses 64 to 67, wherein the global asset exposure score is greater than the source-specific asset exposure score for each of the plurality of sources.

Clause 69. The non-transitory computer-readable medium of any of clauses 64 to 68, further comprising computer-executable instructions that, when executed by the component, cause the component to: determine a global cyber exposure score representing a vulnerability exposure of a plurality of assets to cyber-attacks due to vulnerabilities detected by the plurality of sources based on an average of a plurality of global asset exposure scores for the plurality of assets.

Clause 70. The non-transitory computer-readable medium of any of clauses 64 to 69, further comprising computer-executable instructions that, when executed by the component, cause the component to: determine a source-specific cyber exposure score representing a vulnerability exposure of a plurality of assets to cyber-attacks due to vulnerabilities detected by a single source based on an average of a plurality of asset exposure scores for the plurality of assets with respect to the single source.

Clause 71. The non-transitory computer-readable medium of any of clauses 55 to 70, wherein the plurality of sources comprise a plurality of vulnerability sensors.

Clause 72. The non-transitory computer-readable medium of any of clauses 55 to 71, wherein the plurality of sources comprise: one or more software vulnerabilities; one or more cloud misconfigurations; one or more account misconfigurations; or any combination thereof.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line, or wireless technologies such as infrared, radio, and microwave, then the coaxial cable, fiber optic cable, twisted pair, digital subscriber line, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method, performed by a device, comprising:

obtaining an asset criticality score of an asset;

obtaining a plurality of vulnerability severity parameters associated with the asset from a plurality of sources;

determining a linear component based on the plurality of vulnerability severity parameters;

determining a vulnerability density score of the asset based on the linear component, wherein determining the vulnerability density score comprises dividing the linear component by a sum of the linear component and one to obtain the vulnerability density score;

determining a global asset exposure score of the asset based on the asset criticality score and the vulnerability density score, wherein the global asset exposure score represents a vulnerability exposure of the asset detected by the plurality of sources; and performing one or more actions associated with remediation of the vulnerability exposure of the asset based on the global asset exposure score.

2. The method of claim 1, wherein determining the global asset exposure score comprises:

determining a geometric mean of the asset criticality score and the vulnerability density score.

3. The method of claim 2, wherein determining the global asset exposure score further comprises:

multiplying the geometric mean by a scale factor to obtain the global asset exposure score.

4. The method of claim 1, wherein determining the linear component comprises:

determining a source-specific linear component for each of the plurality of sources, wherein the source-specific linear component is a weighted sum of a plurality of source-specific vulnerability severity parameters for each of the plurality of sources.

5. The method of claim 4, wherein the plurality of source-specific vulnerability severity parameters for each of the plurality of sources is classified by a plurality of levels of vulnerability severity.

6. The method of claim 5, wherein the plurality of source-specific vulnerability severity parameters for each of the plurality of sources comprises a low-vulnerability severity parameter, a medium-vulnerability severity parameter, a high-vulnerability severity parameter, and a critical-vulnerability severity parameter.

7. The method of claim 4, further comprising:

determining a source-specific vulnerability density score for each of the plurality of sources.

8. The method of claim 7, wherein determining the source-specific vulnerability density score comprises:

dividing the source-specific linear component by a sum of the source-specific linear component and one to obtain the source-specific vulnerability density score.

9. The method of claim 8, further comprising:

determining a global cyber exposure score representing a vulnerability exposure of a plurality of assets to cyber-attacks due to vulnerabilities detected by the plurality of sources based on an average of a plurality of global asset exposure scores for the plurality of assets.

10. The method of claim 8, further comprising:

determining a source-specific cyber exposure score representing a vulnerability exposure of a plurality of assets to cyber-attacks due to vulnerabilities detected by a single source based on an average of a plurality of asset exposure scores for the plurality of assets with respect to the single source.

11. The method of claim 7, further comprising:

determining a source-specific asset exposure score for each of the plurality of sources based on the source-specific vulnerability density score and the asset criticality score.

12. The method of claim 11, wherein determining the source-specific asset exposure score comprises:

determining a geometric mean of the asset criticality score and the source-specific vulnerability density score.

13. The method of claim 12, wherein determining the source-specific asset exposure score further comprises:

multiplying the geometric mean by a scale factor to obtain the source-specific asset exposure score.

14. The method of claim 11, wherein the global asset exposure score is greater than the source-specific asset exposure score for each of the plurality of sources.

15. The method of claim 1, wherein the plurality of sources comprise a plurality of vulnerability sensors.

16. The method of claim 1, wherein the plurality of sources comprise:

one or more software vulnerabilities;

one or more cloud misconfigurations;

one or more account misconfigurations;

or any combination thereof.

17. A component, comprising:

one or more memories; and one or more processors communicatively coupled to the one or more memories, the one or more processors, either alone or in combination, configured to:

obtain an asset criticality score of an asset;

obtain a plurality of vulnerability severity parameters associated with the asset from a plurality of sources;

determine a linear component based on the plurality of vulnerability severity parameters;

determine a vulnerability density score of the asset based on the linear component, wherein the one or more processors, either alone or in combination, configured to determine the vulnerability density score comprise the one or more processors, either alone or in combination, configured to divide the linear component by a sum of the linear component and one to obtain the vulnerability density score;

determine a global asset exposure score of the asset based on the asset criticality score and the vulnerability density score, wherein the global asset exposure score represents a vulnerability exposure of the asset detected by the plurality of sources; and perform one or more actions associated with remediation of the vulnerability exposure of the asset based on the global asset exposure score.

18. The component of claim 17, wherein the one or more processors configured to determine the global asset exposure score comprise the one or more processors, either alone or in combination, configured to:

determine a geometric mean of the asset criticality score and the vulnerability density score.

19. The component of claim 18, wherein the one or more processors configured to determine the global asset exposure score comprise the one or more processors, either alone or in combination, configured to:

multiply the geometric mean by a scale factor to obtain the global asset exposure score.

20. The component of claim 17, wherein the one or more processors configured to determine the linear component comprise the one or more processors, either alone or in combination, configured to:

determine a source-specific linear component for each of the plurality of sources, wherein the source-specific linear component is a weighted sum of a plurality of source-specific vulnerability severity parameters for each of the plurality of sources.

21. The component of claim 20, wherein the plurality of source-specific vulnerability severity parameters for each of the plurality of sources is classified by a plurality of levels of vulnerability severity.

22. The component of claim 21, wherein the plurality of source-specific vulnerability severity parameters for each of the plurality of sources comprises a low-vulnerability severity parameter, a medium-vulnerability severity parameter, a high-vulnerability severity parameter, and a critical-vulnerability severity parameter.

23. The component of claim 20, wherein the one or more processors, either alone or in combination, are further configured to:

determine a source-specific vulnerability density score for each of the plurality of sources.

24. The component of claim 23, wherein the one or more processors configured to determine the source-specific vulnerability density score comprise the one or more processors, either alone or in combination, configured to:

divide the source-specific linear component by a sum of the source-specific linear component and one to obtain the source-specific vulnerability density score.

25. The component of claim 24, wherein the one or more processors, either alone or in combination, are further configured to:

determine a global cyber exposure score representing a vulnerability exposure of a plurality of assets to cyber-attacks due to vulnerabilities detected by the plurality of sources based on an average of a plurality of global asset exposure scores for the plurality of assets.

26. The component of claim 24, wherein the one or more processors, either alone or in combination, are further configured to:

determine a source-specific cyber exposure score representing a vulnerability exposure of a plurality of assets to cyber-attacks due to vulnerabilities detected by a single source based on an average of a plurality of asset exposure scores for the plurality of assets with respect to the single source.

27. The component of claim 23, wherein the one or more processors, either alone or in combination, are further configured to:

determine a source-specific asset exposure score for each of the plurality of sources based on the source-specific vulnerability density score and the asset criticality score.

28. The component of claim 27, wherein the one or more processors configured to determine the source-specific asset exposure score comprise the one or more processors, either alone or in combination, configured to:

determine a geometric mean of the asset criticality score and the source-specific vulnerability density score.

29. The component of claim 28, wherein the one or more processors configured to determine the source-specific asset exposure score comprise the one or more processors, either alone or in combination, configured to:

multiply the geometric mean by a scale factor to obtain the source-specific asset exposure score.

30. The component of claim 27, wherein the global asset exposure score is greater than the source-specific asset exposure score for each of the plurality of sources.

31. The component of claim 17, wherein the plurality of sources comprise a plurality of vulnerability sensors.

32. The component of claim 17, wherein the plurality of sources comprise:

one or more software vulnerabilities;

one or more cloud misconfigurations;

one or more account misconfigurations;

or any combination thereof.

33. A non-transitory computer-readable medium storing computer-executable instructions that, when executed by a component, cause the component to:

obtain an asset criticality score of an asset;

obtain a plurality of vulnerability severity parameters associated with the asset from a plurality of sources;

determine a linear component based on the plurality of vulnerability severity parameters;

determine a vulnerability density score of the asset based on the linear component, wherein the computer-executable instructions that, when executed by the component, cause the component to determine the vulnerability density score comprise computer-executable instructions that, when executed by the component, cause the component to divide the linear component by a sum of the linear component and one to obtain the vulnerability density score;

determine a global asset exposure score of the asset based on the asset criticality score and the vulnerability density score, wherein the global asset exposure score represents a vulnerability exposure of the asset detected by the plurality of sources; and perform one or more actions associated with remediation of the vulnerability exposure of the asset based on the global asset exposure score.

34. The non-transitory computer-readable medium of claim 33, wherein the computer-executable instructions that, when executed by the component, cause the component to determine the global asset exposure score comprise computer-executable instructions that, when executed by the component, cause the component to:

determine a geometric mean of the asset criticality score and the vulnerability density score.

35. The non-transitory computer-readable medium of claim 34, wherein the computer-executable instructions that, when executed by the component, cause the component to determine the global asset exposure score comprise computer-executable instructions that, when executed by the component, cause the component to:

multiply the geometric mean by a scale factor to obtain the global asset exposure score.

36. The non-transitory computer-readable medium of claim 33, wherein the computer-executable instructions that, when executed by the component, cause the component to determine the linear component comprise computer-executable instructions that, when executed by the component, cause the component to:

determine a source-specific linear component for each of the plurality of sources, wherein the source-specific linear component is a weighted sum of a plurality of source-specific vulnerability severity parameters for each of the plurality of sources.

37. The non-transitory computer-readable medium of claim 36, wherein the plurality of source-specific vulnerability severity parameters for each of the plurality of sources is classified by a plurality of levels of vulnerability severity.

38. The non-transitory computer-readable medium of claim 37, wherein the plurality of source-specific vulnerability severity parameters for each of the plurality of sources comprises a low-vulnerability severity parameter, a medium-vulnerability severity parameter, a high-vulnerability severity parameter, and a critical-vulnerability severity parameter.

39. The non-transitory computer-readable medium of claim 36, further comprising computer-executable instructions that, when executed by the component, cause the component to:

determine a source-specific vulnerability density score for each of the plurality of sources.

40. The non-transitory computer-readable medium of claim 39, wherein the computer-executable instructions that, when executed by the component, cause the component to determine the source-specific vulnerability density score comprise computer-executable instructions that, when executed by the component, cause the component to:

divide the source-specific linear component by a sum of the source-specific linear component and one to obtain the source-specific vulnerability density score.

41. The non-transitory computer-readable medium of claim 39, further comprising computer-executable instructions that, when executed by the component, cause the component to:

determine a source-specific asset exposure score for each of the plurality of sources based on the source-specific vulnerability density score and the asset criticality score.

42. The non-transitory computer-readable medium of claim 41, wherein the computer-executable instructions that, when executed by the component, cause the component to determine the source-specific asset exposure score comprise computer-executable instructions that, when executed by the component, cause the component to:

determine a geometric mean of the asset criticality score and the source-specific vulnerability density score.

43. The non-transitory computer-readable medium of claim 42, wherein the computer-executable instructions that, when executed by the component, cause the component to determine the source-specific asset exposure score comprise computer-executable instructions that, when executed by the component, cause the component to:

multiply the geometric mean by a scale factor to obtain the source-specific asset exposure score.

44. The non-transitory computer-readable medium of claim 41, wherein the global asset exposure score is greater than the source-specific asset exposure score for each of the plurality of sources.

* * * * *